(12) United States Patent
Chen et al.

(10) Patent No.: US 10,845,918 B2
(45) Date of Patent: Nov. 24, 2020

(54) TOUCH SYSTEM, INPUT DEVICE FOR THE SAME AND SIGNAL TRANSMISSION METHOD FOR THE SAME

(71) Applicant: ELAN MICROELECTRONICS CORPORATION, Hsinchu (TW)

(72) Inventors: Han-Wei Chen, Taipei (TW); Hsuan-Wen Tseng, New Taipei (TW); Yi-Hsin Tao, Hsinchu (TW); Chia-Hsing Lin, Hsinchu (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/561,549

(22) Filed: Sep. 5, 2019

(65) Prior Publication Data

US 2020/0133457 A1 Apr. 30, 2020

Related U.S. Application Data

(60) Provisional application No. 62/750,192, filed on Oct. 24, 2018.

(30) Foreign Application Priority Data

Jul. 4, 2019 (TW) .............................. 108123690 A

(51) Int. Cl.
*G06F 3/041* (2006.01)
*G06F 3/044* (2006.01)
*H04W 4/80* (2018.01)

(52) U.S. Cl.
CPC ...... *G06F 3/04164* (2019.05); *G06F 3/04162* (2019.05); *H04W 4/80* (2018.02);
(Continued)

(58) Field of Classification Search
CPC .... G06F 3/03545; G06F 3/041; G06F 3/0412; G06F 3/0414; G06F 3/0416; G06F 3/04162; G06F 3/04164; G06F 3/044; G06F 3/0442; G06F 2203/04105; G06F 2203/04108; G06F 2203/04112; G06F 2203/04114; H04W 4/80; H04W 12/003
See application file for complete search history.

(56) References Cited

U.S. PATENT DOCUMENTS 9,891,726 B1 * 2/2018 Laslo .................. G06F 3/03545
2013/0106716 A1 * 5/2013 Sundara-Rajan ....... G06F 3/044
345/173

(Continued)

FOREIGN PATENT DOCUMENTS

CN 105659196 A 6/2016
CN 107209584 A 9/2017
(Continued)

*Primary Examiner* — Michael J Eurice
(74) *Attorney, Agent, or Firm* — PatentTM.US

(57) ABSTRACT

A touch system includes a touch device and an input device. The uplink signal transmitted by the touch device includes a timestamp. The input device transmits a downlink signal through the electrode unit and transmits a side information through a wireless communication unit. The inclusion of the corresponding timestamp in the side information ensures that the side information is combined with the corresponding downlink signal to correctly present the user's operation.

17 Claims, 9 Drawing Sheets

(52) U.S. Cl.
CPC .............. *G06F 2203/04105* (2013.01); *G06F 2203/04114* (2019.05)

(56) References Cited

U.S. PATENT DOCUMENTS

| | | | | |
|---|---|---|---|---|
| 2013/0106725 A1* | 5/2013 | Bakken | ................ | G06F 3/0346 345/173 |
| 2013/0106741 A1* | 5/2013 | Pedersen | ................ | G06F 3/044 345/173 |
| 2013/0106762 A1* | 5/2013 | Shahparnia | ........... | G06F 3/0383 345/174 |
| 2013/0106766 A1* | 5/2013 | Yilmaz | ................ | G06F 3/0383 345/174 |
| 2013/0106794 A1* | 5/2013 | Logan | .................... | G06F 3/044 345/179 |
| 2013/0106797 A1* | 5/2013 | Pant | .................... | G06F 3/03545 345/179 |
| 2013/0106912 A1* | 5/2013 | Um | .............................. | 345/649 |
| 2013/0222238 A1* | 8/2013 | Sliger | ................ | G06F 3/03545 345/157 |
| 2014/0176495 A1* | 6/2014 | Vlasov | ............... | G06F 3/03545 345/174 |
| 2015/0054776 A1* | 2/2015 | Reitan | .................... | G06F 3/044 345/174 |
| 2015/0070293 A1* | 3/2015 | Yu | ........................ | G06F 3/0416 345/174 |
| 2015/0138164 A1* | 5/2015 | Hinson | ............... | G06F 3/03545 345/179 |
| 2015/0153845 A1* | 6/2015 | Chang | .................... | G06F 3/0416 345/179 |
| 2015/0193025 A1* | 7/2015 | Rebeschi | .............. | G06F 3/0416 345/174 |
| 2015/0193033 A1* | 7/2015 | Westhues | .............. | G06F 3/0383 345/173 |
| 2015/0268742 A1* | 9/2015 | Park | ...................... | G06F 3/0481 345/179 |
| 2016/0202785 A1* | 7/2016 | Bell | ...................... | G06F 3/0416 345/173 |
| 2016/0378208 A1* | 12/2016 | Shahparnia | ........... | G06F 3/0383 345/173 |
| 2017/0060276 A1* | 3/2017 | Qiao | ...................... | G06F 3/0416 |
| 2017/0131798 A1* | 5/2017 | Geaghan | ................. | G06F 3/044 |
| 2017/0147140 A1* | 5/2017 | Kosugi | ................. | G06F 3/0416 |
| 2017/0153763 A1* | 6/2017 | Vavra | .................... | G06F 3/0488 |
| 2017/0249028 A1* | 8/2017 | Marshall | ............. | G06F 3/03545 |
| 2017/0308186 A1* | 10/2017 | Yamamoto | .............. | G06F 3/038 |
| 2018/0018057 A1* | 1/2018 | Bushnell | ................. | G06F 3/043 |
| 2018/0129313 A1* | 5/2018 | Westhues | ............ | G06F 3/03545 |
| 2018/0284910 A1* | 10/2018 | Peretz | .................... | G06F 3/0386 |
| 2018/0288208 A1* | 10/2018 | Lee | .................... | H04M 1/72527 |
| 2019/0050109 A1* | 2/2019 | King-Smith | .......... | G06F 3/0416 |
| 2019/0087025 A1* | 3/2019 | Holsen | ................. | G06F 1/3259 |
| 2019/0102014 A1* | 4/2019 | Gur | ........................ | G06F 3/0412 |
| 2019/0155448 A1* | 5/2019 | Chia | ................. | G06F 3/041661 |
| 2019/0235728 A1* | 8/2019 | Konda | ................. | G06F 3/0442 |
| 2020/0089360 A1* | 3/2020 | Sen | ..................... | G06F 3/04886 |
| 2020/0110477 A1* | 4/2020 | Park | ..................... | G06F 1/3215 |
| 2020/0174589 A1* | 6/2020 | Hara | ..................... | G06F 3/0416 |
| 2020/0192521 A1* | 6/2020 | Case, Jr. | ............... | G06F 3/0383 |

FOREIGN PATENT DOCUMENTS

| | | |
|---|---|---|
| CN | 108268153 A | 7/2018 |
| CN | 108496175 A | 9/2018 |
| TW | 201734722 A | 10/2017 |

\* cited by examiner

TOUCH SYSTEM, INPUT DEVICE FOR THE SAME AND SIGNAL TRANSMISSION METHOD FOR THE SAME

CROSS-REFERENCE TO RELATED APPLICATIONS

This application claims the benefit of U.S. provisional application filed on Oct. 24, 2018 and having application Ser. No. 62/750,192, the entire contents of which are hereby incorporated herein by reference.

This application is based upon and claims priority under 35 U.S.C. 119 from Taiwan Patent Application No. 108123690 filed on Jul. 4, 2019, which is hereby specifically incorporated herein by this reference thereto.

BACKGROUND OF THE INVENTION

1. Field of the Invention

The present invention relates to a touch system, especially to a signal transmission method for an input device and a touch device of the touch system.

2. Description of the Prior Arts

For the operation of the touch device, in addition to using a finger as an input tool, a stylus is also commonly used as an input device for a touch device. The touch device sends an uplink signal. When the stylus approaching the touch device receives the uplink signal, the stylus sends a downlink signal through its electrode unit to the touch device. Multiple touch electrodes of the touch device receive the downlink signal, thereby further determining the position of the stylus. As the technology evolves, only known that the position of the stylus is not enough to cope with the required functions. It is necessary to transmit some side information of the stylus to increase the variability of the application such as the pressure of the stylus touching the touch device (pen pressure information), the button operation on the stylus, the tilt angle of the stylus, etc. It is also necessary to transmit some stylus usage information so that the user can control the state of the stylus at any time during use, such as the remaining capacity of the battery.

However, if all the side information is transmitted only through the downlink signal, the information contained in the downlink signal may be too large to require more time for receiving. Therefore, further improvement of the existing technology should be considered.

SUMMARY OF THE INVENTION

In view of this, the present invention is to solve the problem that the information contained in the downlink signal is too large, resulting in more time to receive, and the synchronization problem between the side information and the downlink signal.

To achieve the aforementioned objective, the present invention provides a touch system comprising:
  a touch device having
    a control unit;
    a touch interface having multiple touch electrodes electrically connecting to the control unit; and
    a wireless communication unit electrically connecting to the control unit; and
  an input device having
    a body having a contact end;
    a controller mounted in the body;
    at least one electrode unit mounted in the body and electrically connecting to the controller; and
    a wireless communication unit mounted in the body and electrically connecting to the controller;
  wherein when the input device receives an uplink signal sent by the touch device, the controller of the input device sends a downlink signal through the electrode unit and the touch electrode of the touch device receives the downlink signal;
  wherein the wireless communication unit of the input device sends a side information and the wireless communication unit of the touch device receives the side information;
  wherein the uplink signal includes a time stamp indicating a sent time, and the side information includes the time stamp corresponding to the received uplink signal.

The present invention also provides a signal transmission method for a touch system, wherein the touch system comprises a touch device and an input device and the method comprises steps of:
  transmitting an uplink signal by the touch device, wherein the uplink signal including a time stamp;
  transmitting a downlink signal by the input device to the touch device when the input device receives the uplink signal, and a wireless communication unit of the input device transmits a side information to the touch device, wherein the side information includes the time stamp corresponding to the uplink signal received in the same frame.

The advantage of the present invention is described as following. Through the use of the time stamp, the touch device quickly distinguishes the side information corresponding to the downlink signal received at the time, thereby improving the reliability of the synchronization of the downlink signal and the side information, so that the response result of the touch device is close to the user's desired operation.

Other objectives, advantages and novel features of the invention will become more apparent from the following detailed description when taken in conjunction with the accompanying drawings.

DETAILED DESCRIPTION OF THE EMBODIMENTS

Figure 1A:
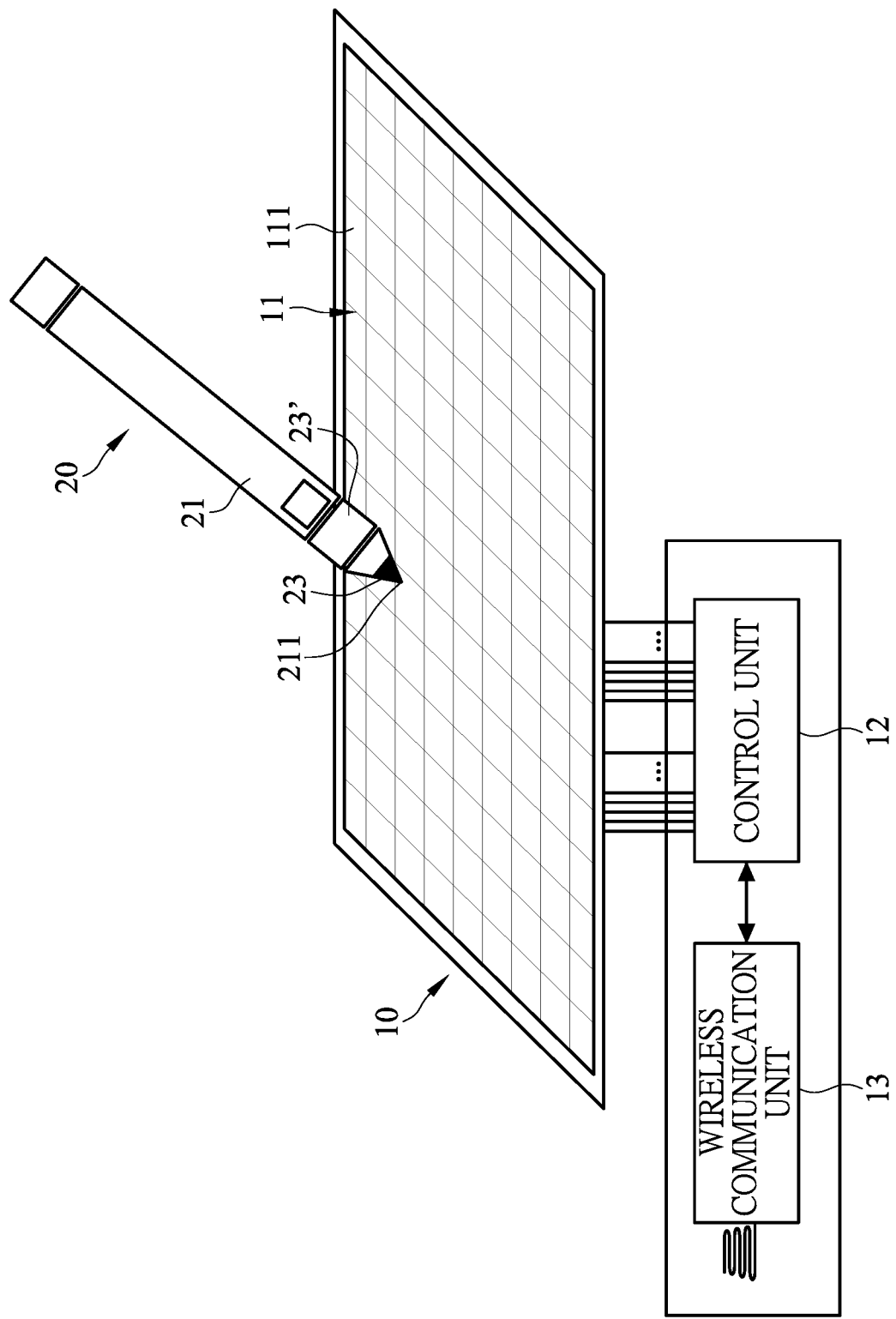
FIG. 1A is an illustrative view of a first embodiment of a touch system in accordance with the present invention.

With reference to FIG. 1A, a touch system in accordance with the present invention comprises a touch device 10 and an input device 20.

Figure 1B:
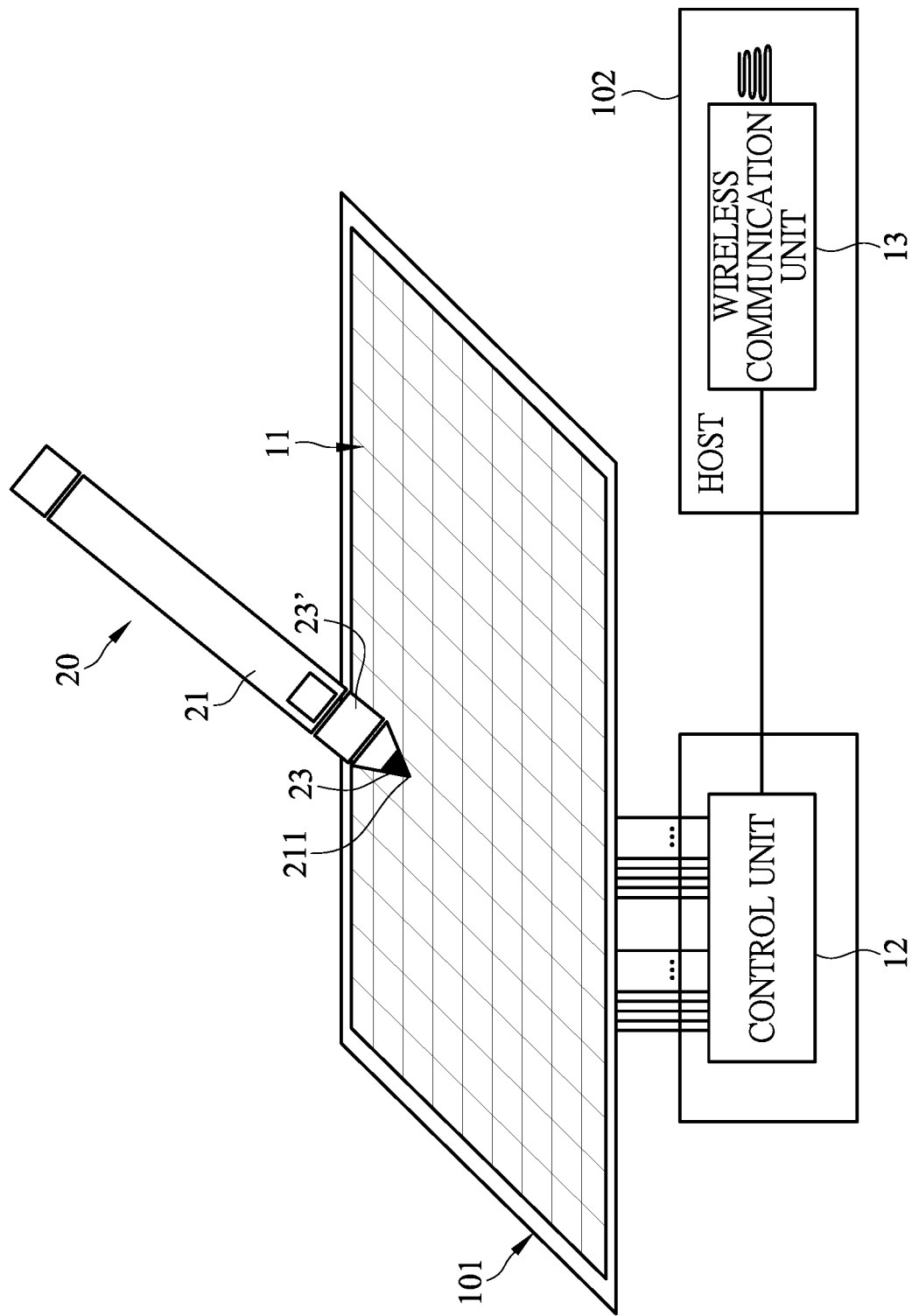
FIG. 1B is an illustrative view of a second embodiment of a touch system in accordance with the present invention.

The touch device 10 has a touch interface 11, a control unit 12 and a wireless communication unit 13. The touch interface 11 has multiple touch electrodes 111. The touch electrodes 111 and the wireless communication unit 13 electrically connect respectively to the control unit 12. The touch interface 11 includes a touch contact surface. The touch electrodes 111 are disposed under the touch contact surface and are arranged in a matrix including electrodes along X and Y directions to transmit and receive signals. The touch electrodes 111 may be formed by indium tin oxide (ITO) or other electrical conductors, or may be formed by a common electrode layer of a display, or their combination. The wireless communication unit 13 is used to transmit and receive signals. In one embodiment as shown in FIG. 1A, the wireless communication unit 13 and the control unit 12 are integrated on a circuit board. In another embodiment as shown in FIG. 1B, the touch device 10 comprises a host 102. The control unit 12 of this embodiment is independent of the host 102 for performing touch detection, and the wireless communication unit 13 is integrated into a processor of the host 102. In one embodiment, the wireless communication unit 13 is a Bluetooth communication unit or a Zigbee communication unit.

Figure 2:
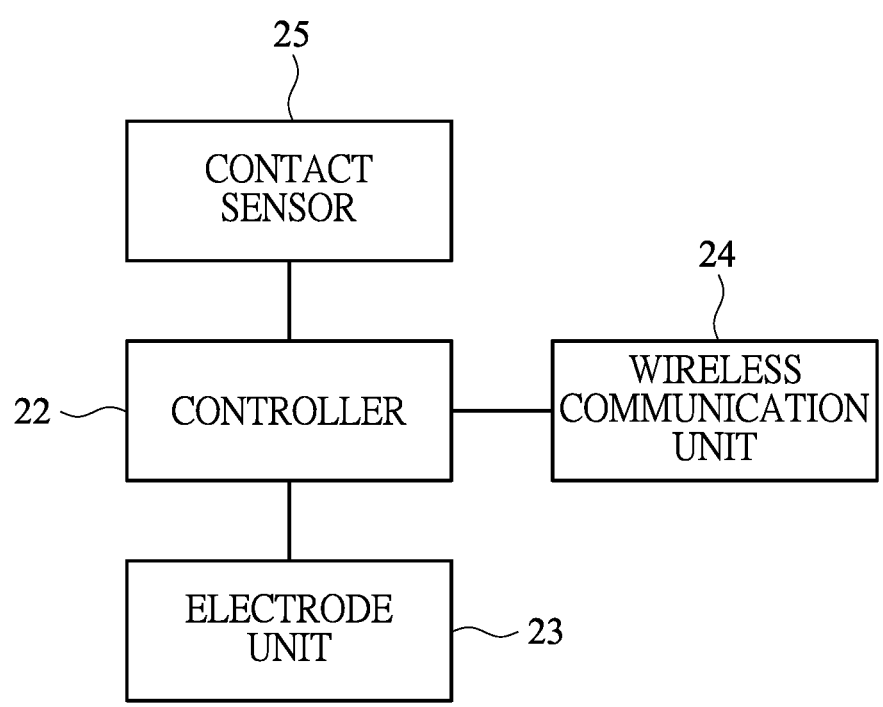
FIG. 2 is a partial block diagram of an input device of the touch system in FIGS. 1A and 1B.

With reference to FIGS. 1A and 2, the input device 20 comprises a body 21, a controller 22, at least one electrode unit 23, a wireless communication unit 24 and a contact sensor 25. The body 21 has a contact end 211. The input device 20 may be a stylus and the contact end 211 is disposed on a tip of the stylus. The controller 22, the electrode unit 23 and the wireless communication unit 24 are mounted in the body 21. The electrode unit 23, the wireless communication unit 24 and the contact sensor 25 electrically connect respectively to the controller 22. In this embodiment, the input device 20 has two electrode units 23, 23'. One of the electrode units 23 is used to transmit and receive signals, and the other one of the electrode units 23' is used to receive signals. In another embodiment, the input device 20 may only have single electrode unit 23 disposed near an end of the input device 20 to transmit and receive signals at different times. The wireless communication unit 24 is used to transmit signals. The contact sensor 25 is used to sense if the contact end 211 of the input device 20 contacts the touch contact surface of the touch device 10. In one embodiment, the wireless communication unit 24 is a Bluetooth communication unit or a Zigbee communication unit. In one embodiment, the contact sensor 25 is a pressure sensor to sense the pressure when the contact end 211 of the input device 20 contacts the touch interface 11 of the touch device 10.

Figure 3:
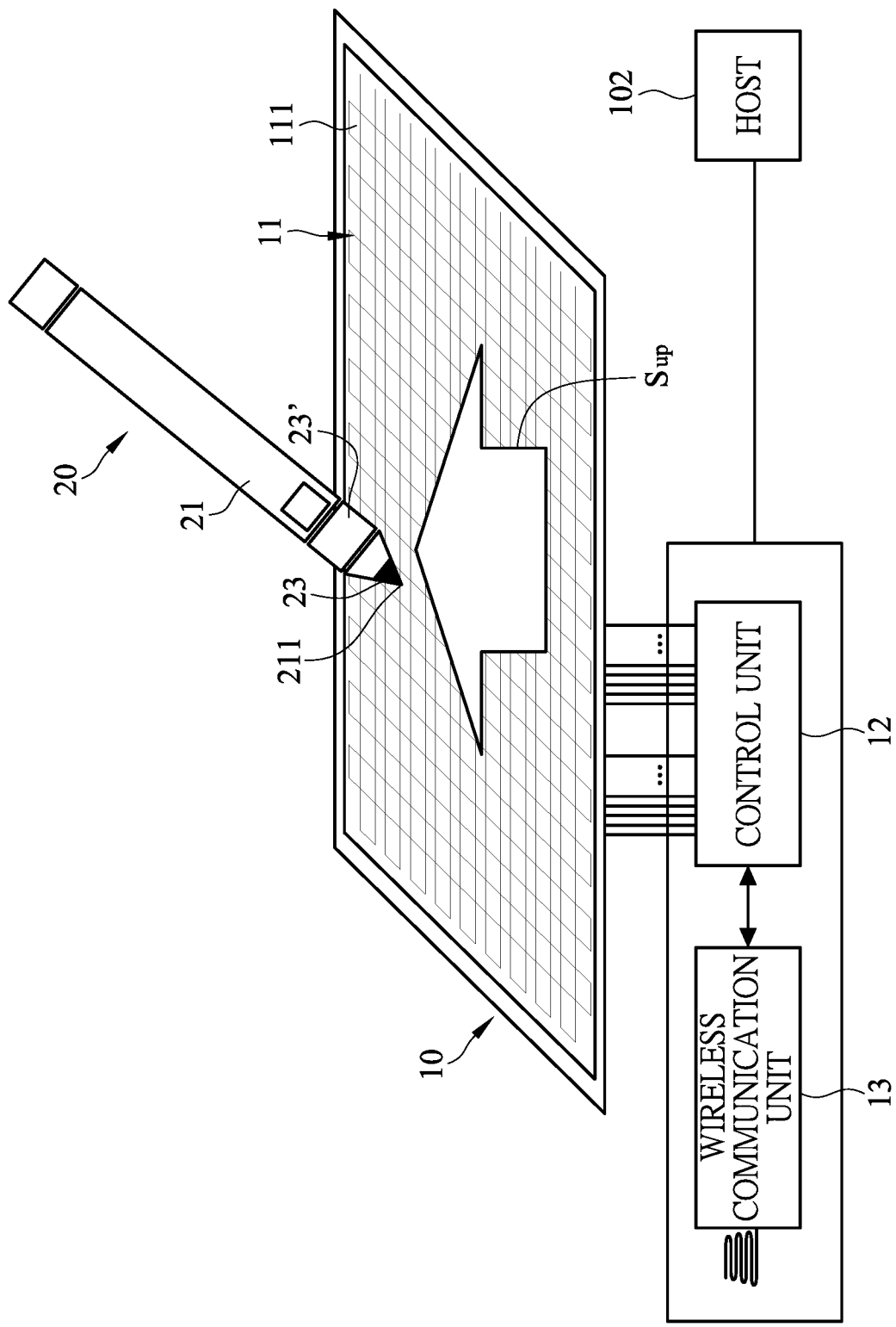
FIG. 3 is an operational illustrative view of the touch system in FIG. 1, shown the uplink signal transmitting.

With reference to FIG. 3, the touch device 10 periodically sends an uplink signal $S_{up}$ according to the protocol when the touch device 10 works. The uplink signal $S_{up}$ comprises a synchronization information and a time stamp. The synchronization information includes a time for the input device 20 to send a downlink signal $S_{down}$. The time stamp is used to indicate a sent time for sending the uplink signal $S_{up}$ and may be demonstrated in different ways. For example, the time stamp is demonstrated by a relative time, such as "5m31s after booting." For another example, the time stamp is demonstrated by an absolute time, such as "2019 Jun. 6, 17 15:41." For yet another example, the time stamp is demonstrated by a time serial number such as "$53^{th}$ period." In one embodiment, the touch device 10 sends the uplink signal $S^{up}$ once in each frame, and the time stamp in the uplink signal $S^{up}$ indicates this frame. In one embodiment, a frame of the touch device 10 means all of the touch electrodes 111 are finish their touch sensing.

With reference to FIGS. 2 to 5, the input device 20 receives the uplink signal $S^{up}$ sent from the touch device 10 via the electrode unit 23' when the input device 20 hovers above or contacts the touch device 10. Then the input device 20 sends said downlink signal $S_{down}$ via another electrode unit 23 and said downlink signal $S_{down}$ is received by the touch electrodes 111 of the touch device 10 so that the positions and the moving tracks of the input device 20 on the touch device 10 is determined. The input device 20 also sends a side information $S_{side}$ via the wireless communication unit 24 of the input device 20. The side information $S_{side}$ mainly includes at least one of the information such as a pressure information of the input device 20 contacting the touch device 10, a tilt angle information of the input device 20, a power information of the input device 20, and a button information of the input device 20, and the like. The side information $S_{side}$ also includes the time stamp $S_t$ to indicate the time. The side information $S_{side}$ including the time stamp $S_t$ are received by the wireless communication unit 13 of the touch device 10. The control unit 12 of the touch device 10 combines the side information $S_{side}$ and the corresponding downlink signal $S_{down}$ based on the time stamp $S_t$ of the side information $S_{side}$, and then proceeds subsequent determination. In one embodiment, in each frame, the wireless communication unit 24 of the input device 20 sends the side information $S_{side}$ once, and the time stamp $S_t$ included in the side information $S_{side}$ indicates the time corresponding to the uplink signal $S^{up}$ received in this frame. In another embodiment, the wireless communication unit 24 of the input device 20 transmits the side information $S_{side}$ a plurality of times in each frame. Besides the time stamp $S_t$ corresponding to the uplink signal $S^{up}$ received in that frame, the side information $S_{side}$ sent in each frame, includes a sequential stamp indicating the sequence of the side information $S_{side}$ in that frame. For example, the wireless communication unit 24 of the input device 20 sends the side information $S_{side}$ four times in the frame. The first side information $S_{side}$ includes, in addition to the aforementioned time stamp $S_t$, a sequential stamp indicating the first side information $S_{side}$ of the frame. The rest side information $S_{side}$ is also like this and described repeatedly.

Figure 5:
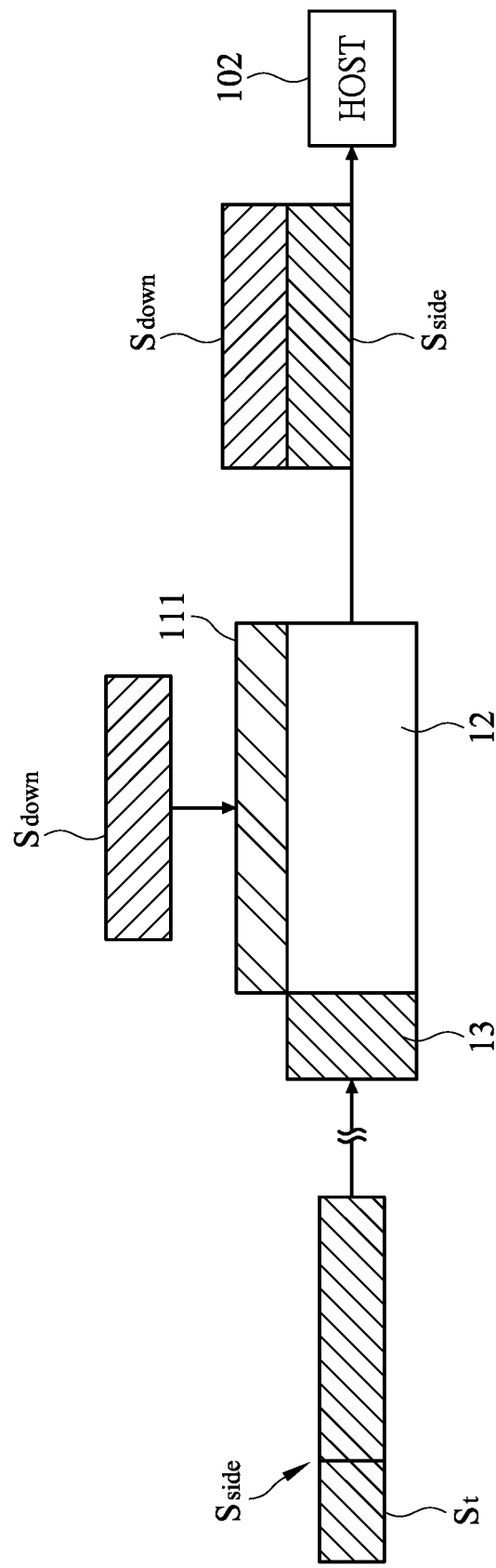
FIGS. 5 and 7 are illustrative views to show the signals transmitted in the touch system of the touch system in FIGS. 1A and 1B.
Figure 6:
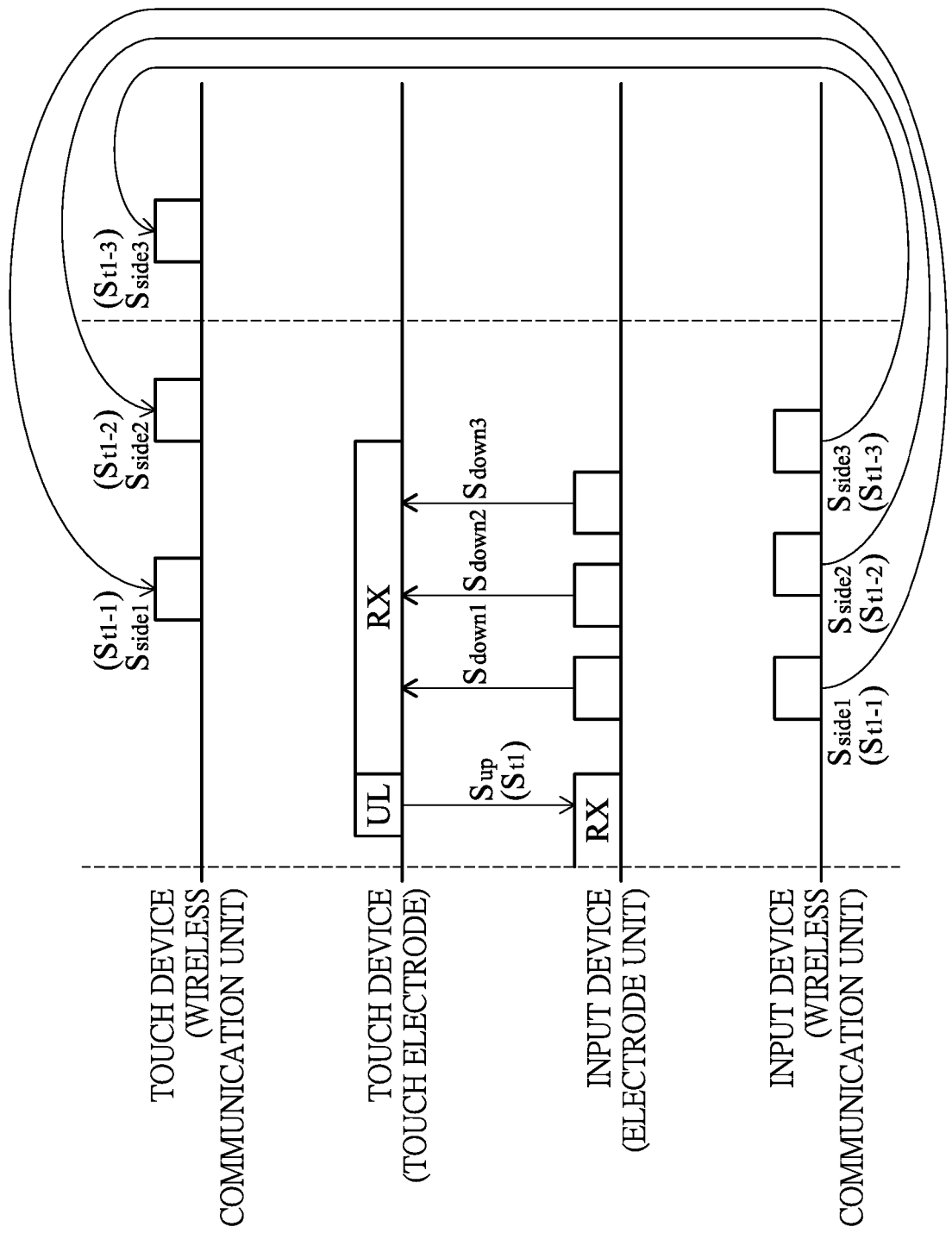
FIG. 6 is an illustrative view to show the signals transmitted path of the touch system in FIGS. 1A and 1B.

With reference to FIG. 6 with FIGS. 2 and 5, one frame is used as an example. The electrode unit 23' of the input device 20 receives the uplink signal $S^{up}$ sent from the touch electrodes 111 of the touch device 10. The uplink signal $S^{up}$ includes a timestamp $S_{t1}$ indicating the transmission time. The touch device 10 then enters a receiving mode RX, and is ready to receive the signal sent from the electrode unit 23 of the input device 20 via the touch electrodes 111. When the uplink signal $S_{up}$ is received by the input device 20, the input device 20 transmits the first downlink signal $S_{down1}$, the second downlink signal $S_{down2}$, and the third downlink signal $S_{down3}$ through the electrode unit 23 according to the synchronization information in the uplink signal $S^{up}$ in the frame. The touch electrode 111 of the touch device 10 receives the downlink signals $S_{down1}$, $S_{down2}$, and $S_{down3}$ in the frame. The downlink signals $S_{down1}$, $S_{down2}$, and $S_{down3}$ are used to determine the position of the input device 20 relative to the touch device 10. The downlink signals $S_{down1}$, $S_{down2}$, and $S_{down3}$ may include information for determining the location of the input device 20 relating to the touch device 10, and may include related information of the input device, for example, identification (ID), etc. In addition, in the frame, the wireless communication unit 24 of the input device 20 transmits the first side information $S_{side1}$, the second side information $S_{side2}$, and the third side information $S_{side3}$. The side information $S_{side1}$, the second side information $S_{side2}$, and the third side information and $S_{side3}$ are received by the wireless communication unit 13 of the touch device 10. The side information $S_{side1}$, $S_{side2}$ and $S_{side3}$ may be the aforementioned pressure information, tilt angle information or button information and the like. Moreover, the first side information $S_{side1}$ includes a first timestamp $S_{t1-1}$, the second side information $S_{side2}$ includes a second timestamp $S_{t1-2}$, and the third side information $S_{side3}$ includes a third timestamp $S_{t1-3}$. The first, second, and third time stamps $S_{t1-1}$, $S_{t1-2}$, and $S_{t1-3}$ respectively include a time stamp $S_{t1}$ included in the uplink signal $S^{up}$ corresponding to that frame, and further include the sequential information of the side information.

When the touch device 10 receives the downlink signals $S_{down1}$, $S_{down2}$, and $S_{down3}$, the touch device 10 fills them into the record part of the firmware corresponding to the frame. For example, if the touch device 10 transmits the uplink signal $S^{up}$ in a first frame, the touch device 10 fills the downlink signals $S_{down1}$, $S_{down2}$, and $S_{down3}$ into the record part of the firmware corresponding to the first frame after receiving the downlink signals $S_{down1}$, $S_{down2}$, and $S_{down3}$. In addition, according to the time stamp $S_{t1}$, the side information $S_{side1}$, $S_{side2}$, and $S_{side3}$ are filled into the other record part of the firmware corresponding to the first frame and the time stamp $St_1$ when the touch device 10 receives the side information $S_{side1}$, $S_{side2}$, and $S_{side3}$. Thereby recording the coordinates, pressure information, button information, ID, etc. of the input device 20 in the first frame. When the information is integrated, the integrated content is transmitted to the host 102.

The wireless communication unit 13 of the touch device 10 may not receive the side information $S_{side}$ in the frame due to the delay of the signal when the wireless communication unit 24 of the input device 20 transmits the side information $S_{side}$. For example, as shown in FIG. 6, the third side information $S_{side3}$ is received by the wireless communication unit 13 of the touch device 10 in the next frame. However, since the third time stamp $S_{t1-3}$ is included in the third side information $S_{side3}$, the touch device 10 still identifies the third side information $S_{side3}$ received at this time through the third time stamp $S_{t1-3}$ to which the frame it belongs to. Therefore, when the third side information $S_{side3}$ is filled in the firmware, not receiving the third side information $S_{side3}$ in its original frame does not cause the touch device 10 to record the related information to the wrong record part.

Therefore, the use of the aforementioned time stamp $S_t$ effectively ensures that the side information $S_{side}$ can be combined with the downlink signal $S_{down}$ corresponding to the same frame. The user's operation can be correctly presented to avoid data loss or the appearance of ink leakage due to delay in wireless transmission.

Figure 4:
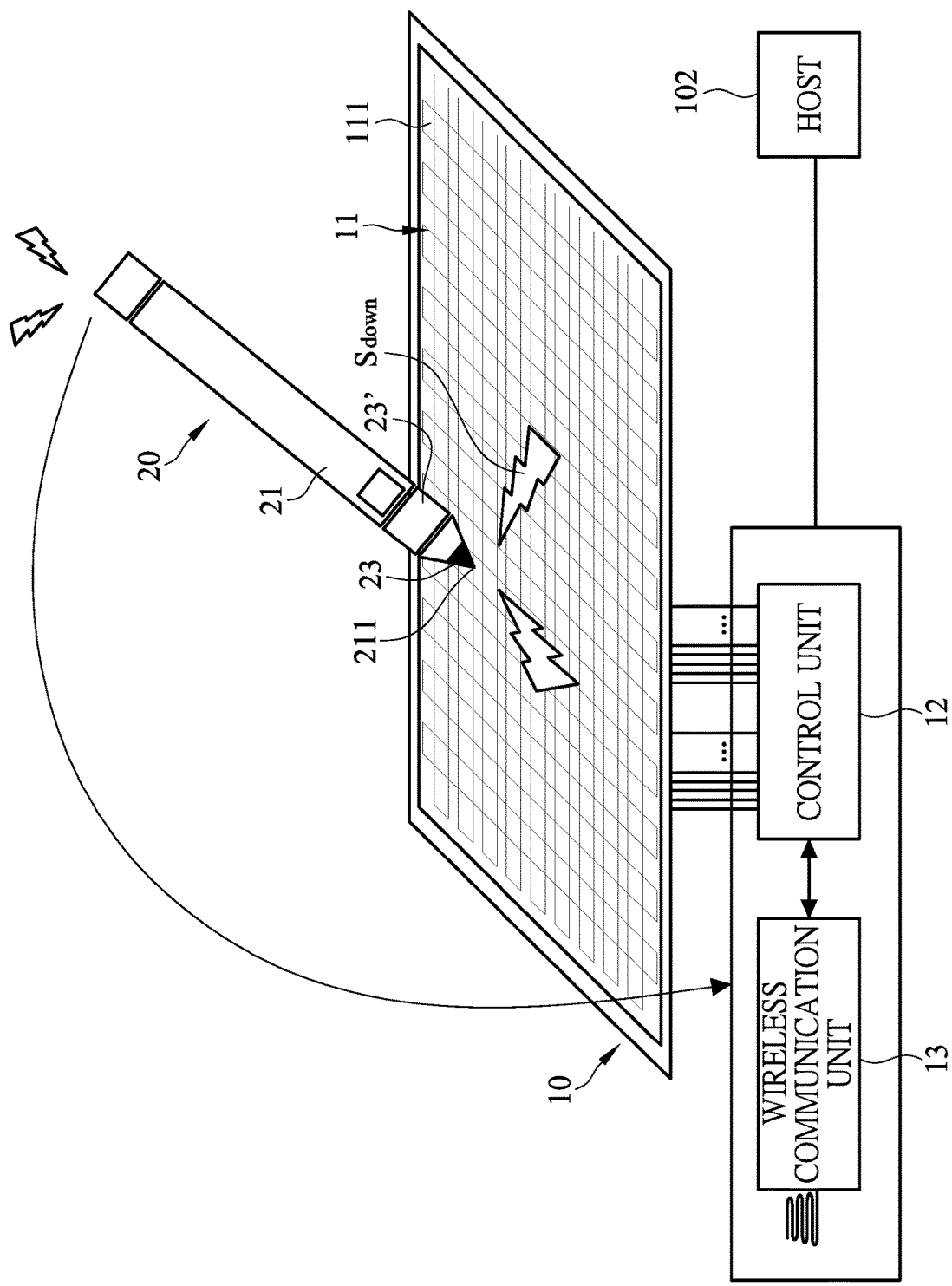
FIG. 4 is an operational illustrative view of the touch system in FIG. 1, shown the downlink signal and side information transmitting.
Figure 7:
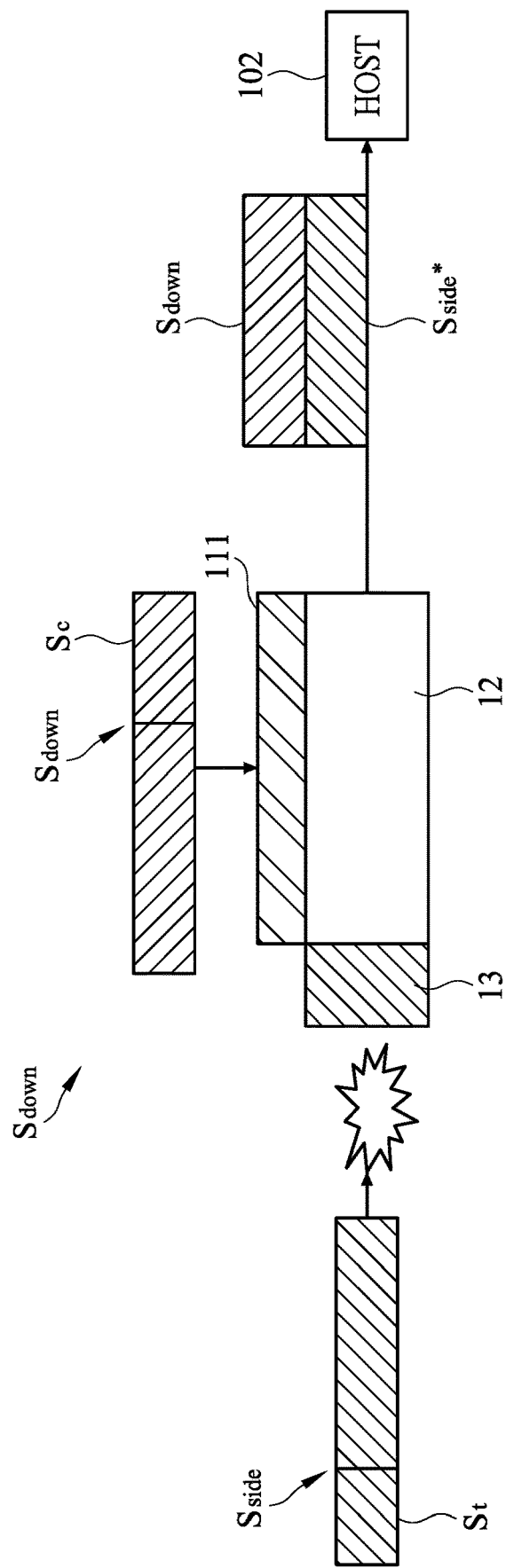

With reference to FIGS. 2, 4 and 7, the input device 20 performs writing on the touch contact surface of the touch device 10, and any of the wireless communication units 13 and 24 of the touch device 10 and the input device 20 suddenly fails or the wireless communication signal is interfered so that the side information $S_{side}$ is not sent or received normally. At this time, the contact sensor 25 of the input device 20 senses whether the contact end 211 of the input device 20 contacts the touch contact surface of the touch device 10 to obtain a message for assisting the determination, i.e. the downlink signal $S_{down}$ further includes a contact message $S_c$. In one embodiment, the contact sensor 25 is the pressure sensor. When the pressure value sensed by the contact sensor 25 is greater than a threshold (for example, the threshold value is 0), the input device 20 is determined that the contact end 211 contacts the touch device 10, and vice versa.

When the contact end 211 of the input device 20 contacts the touch device 10, the contact message $S_c$ is presented as a first message. When the contact end 211 of the input device 20 does not contact the touch device 10, the contact message $S_c$ is presented as a second message. The first message is different to the second message. For example, the first message may be 0 and the second message may be 1. The touch device 10 knows whether the contact end 211 of the input device 20 contacts the touch device 10 by using the contact message $S_c$ included in the received downlink signal $S_{down}$. In one embodiment, a simulated side information $S_{side}*$ can be derived from the received contact information $S_c$ and the previously received side information $S_{side}$, and the user experience can be maintained through the simulated side information $S_{side}*$. For example, the wireless communication unit 13 of the touch device 10 receives the side information $S_{side}$ normally in the $1^{st}$ to $5^{th}$ frames, but does not receive the side information $S_{side}$ in the $6^{th}$ frame. A simulated side information $S_{side}*$ is determined through the contact message $S_c$ received in the $6^{th}$ frame and the side information $S_{side}$ received in at least one of the previous frames. For example, the pressure value of the $5^{th}$ frame or the average pressure value of the $3^{rd}$, $4^{th}$, $5^{th}$ frames is directly used as the pressure value of the $6^{th}$ frame (that is, the simulation side information $S_{side}*$), or a speed of the movement of the contact end 211 of the input device 20 is used as the weight value to calculate the pressure value of the $6^{th}$ frame based on the pressure value in the side information of the previous frame, wherein the speed is inversely proportional to the weight value of the pressure value.

Figure 8:
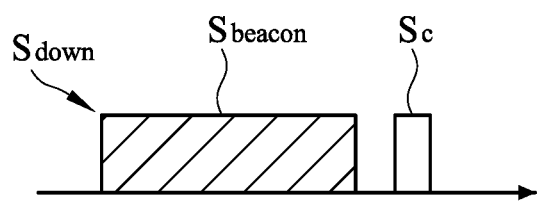
FIG. 8 is an illustrative view of a first embodiment of a downlink signal of the touch system in FIGS. 1A and 1B.
Figure 9:
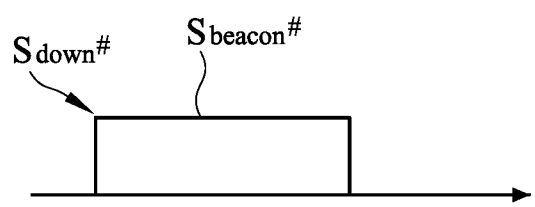
FIG. 9 is an illustrative view of a second embodiment of a downlink signal of the touch system in FIGS. 1A and 1B.

The contact message $S_c$ included in the downlink signal $S_{down}$ can be presented in different manners. In one embodiment as shown in FIG. 8, the downlink signal $S_{down}$ includes a beacon message $S_{beacon}$ and the contact message $S_c$. When the contact end 211 of the input device 20 contacts the touch device 10, the contact message $S_c$ is presented as the first message. When the contact end 211 of the input device 20 does not contact the touch device 10, the contact message $S_c$ is presented as the second message. In another embodiment as shown in FIG. 9, the downlink signal $S_{down\ \#}$ includes a beacon message $S_{beacon\ \#}$, and the beacon message $S_{beacon\ \#}$ presents the contact message $S_c$ at different frequencies. When the contact end 211 of the input device 20 contacts the touch device 10, the beacon message $S_{beacon\ \#}$ presents at a first frequency. When the contact end 211 of the input device 20 does not contact the touch device 10, the beacon message $S_{beacon\ \#}$ presents at a second frequency.

Therefore, the touch device 10 realizes whether the input device 20 has contact with the touch device 10 by using the contact information $S_c$ regardless of whether the wireless communication unit is used or the wireless communication unit is disabled. The pressure of the input device 20 corresponding to the touch device 10 and other possible side information can be further simulated by an algorithm.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touch system comprising:
   a touch device having
      a control unit;
      a touch interface having multiple touch electrodes electrically connecting to the control unit; and
      a wireless communication unit electrically connecting to the control unit; and
   an input device having
      a body having a contact end;
      a controller mounted in the body;
      at least one electrode unit mounted in the body and electrically connecting to the controller; and
      a wireless communication unit mounted in the body and electrically connecting to the controller;
   wherein when the input device receives an uplink signal sent by the touch device, the controller of the input device sends a downlink signal through the electrode unit and the touch electrode of the touch device receives the downlink signal;
   wherein the wireless communication unit of the input device sends a side information and the wireless communication unit of the touch device receives the side information;
   wherein the uplink signal includes a time stamp indicating a sent time, and the side information includes the time stamp corresponding to the received uplink signal.

2. The touch system as claimed in claim 1, wherein the wireless communication unit of the touch device and the control unit of the touch device are integrated on a circuit board.

3. The touch system as claimed in claim 1, wherein the touch device comprises a host, and the wireless communication unit of the touch device is integrated into a processor of the host.

4. The touch system as claimed in claim 1, wherein the wireless communication units are Bluetooth communication units or Zigbee communication units.

5. The touch system as claimed in claim 1, wherein
   the input device comprises a contact sensor mounted on the contact end of the body to sense whether the contact end of the input device contacts the touch device;
   the downlink signal comprises a first message when the input device contacts the touch device;
   the downlink signal comprises a second message when the input device does not contact the touch device; and
   the first message is different to the second message.

6. The touch system as claimed in claim 5, wherein
   the contact sensor is a pressure sensor to sense the pressure when the contact end of the input device contacts the touch device; and
   when the pressure value sensed by the contact sensor is greater than a threshold, the input device is determined that the contact end contacts the touch device.

7. A signal transmission method for a touch system, wherein the touch system comprises a touch device and an input device and the method comprises steps of:
   transmitting an uplink signal by the touch device, wherein the uplink signal including a time stamp;
   transmitting a downlink signal by at least one electrode unit of the input device to the touch device when the input device receives the uplink signal, and transmitting a side information to the touch device by a wireless communication unit of the input device, wherein the side information includes the time stamp corresponding to the uplink signal received in the same frame.

8. The signal transmission method for a touch system as claimed in claim 7, wherein the time stamp represents as a relative time, an absolute time or a time sequence.

9. The signal transmission method for a touch system as claimed in claim 7, wherein the touch device transmits the uplink signal once in each frame, and the time stamp in the uplink signal indicates the frame that the uplink signal is transmitted.

10. The signal transmission method for a touch system as claimed in claim 9, wherein the wireless communication unit of the input device transmits the side information once in each frame, and the time stamp in the side information corresponding to the time stamp in the uplink signal received in the same frame.

11. The signal transmission method for a touch system as claimed in claim 9, wherein the wireless communication unit of the input device transmits the side information multiple times in each frame, and the time stamp in each side information corresponding to the time stamp in the uplink signal received in the same frame, and the time stamp in each side information includes a sequential stamp of each side information.

12. The signal transmission method for a touch system as claimed in claim 7, wherein
   when the step of transmitting the downlink signal by the input device proceeds, the downlink signal comprises a first message when the input device contacts the touch device; and
   when the step of transmitting the downlink signal by the input device proceeds, the downlink signal comprises a second message when the input device does not contact the touch device, wherein the second message is different to the first message.

13. The signal transmission method for a touch system as claimed in claim 12, wherein
   the downlink signal includes a beacon signal and the first message when the input device contacts the touch device; and
   the downlink signal includes the beacon signal and the second message when the input device does not contact the touch device.

14. The signal transmission method for a touch system as claimed in claim 12, wherein
   the downlink signal includes a beacon signal at a first frequency to represent the first message when the input device contacts the touch device; and
   the downlink signal includes the beacon signal at a second frequency to represent the second message when the input device does not contact the touch device, wherein the second frequency is different to the first frequency.

15. The signal transmission method for a touch system as claimed in claim 12, wherein the side information includes a pressure information of the input device contacting the touch device.

16. The signal transmission method for a touch system as claimed in claim 15, wherein when the touch device does not receive the side information sent by the input device and receives the first message in the downlink signal transmitted by the input device in the same frame, the touch device obtains a simulated side information according to the side information received by at least one of the previous frame, and uses the simulated side information as the pressure information of the frame in which the side information from the input device is not received.

17. The signal transmission method for a touch system as claimed in claim 7, wherein the side information includes at least one of the information of a tilt angle information of the input device, a power information of the input device and a button information of the input device.

* * * * *